United States Patent Office 3,285,941
Patented Nov. 15, 1966

3,285,941
PROCESS OF PREPARING VINYL ESTERS OF CARBOXYLIC ACIDS
Willem F. Engel and Gottfried E. Rumscheidt, Amsterdam, Netherlands, assignors to Shell Oil Company, New York, N.Y., a corporation of Delaware
No Drawing. Filed July 9, 1963, Ser. No. 293,887
Claims priority, application Netherlands, July 10, 1962, 280,722
9 Claims. (Cl. 260—410.9)

This invention relates to an improved process for the preparation of vinyl esters of carboxylic acids by a catalyzed reaction of acetylene with carboxylic acids.

A considerable amount of commercial interest is centered around the vinyl esters of carboxylic acids, especially those having between 8 and 19 atoms per molecule, since these esters demonstrate good chemical stability and are particularly useful in polymeric and copolymeric compounds, such as emulsion paints and as modifiers in alkyd and epoxy resins. Of this group, the vinyl esters of the alpha-branched carboxylic acids in which the alpha carbon atom is a tertiary or quaternary carbon atom show superiority in most of the above applications and, in addition, are excellent additives for adjusting the temperature and viscosity relationships in lubricating oils.

It is known that some vinyl esters of carboxylic acids can be prepared by reacting these acids with acetylene in the presence of a catalyst. However, as the number of carbon atoms increases in the carboxylic acid, the reaction becomes impractical in a commercial sense because yields are low and the high temperatures involved favor the formation of polymeric compounds. Also, the catalysts used in the acetylene addition reactions of this type are good polymerization catalysts which favor the polymerized products. Consequently, the known processes are concerned with the preparation of the vinyl esters of the lowest members of the fatty acid series, e.g., acids with less than 5 carbon atoms such as acetic, propionic and valeric acids.

In the preparation of the vinyl esters of carboxylic acids having from 5 to 12 carbon atoms, processes are known which involve the use of acetylene under pressure in the reaction zone. While these pressurized processes may improve the yield of the vinyl esters from 5% to 20%, care must be taken to avoid the explosive hazard of the pressurized acetylene. The explosive hazard can be lessened to some degree by diluting the acetylene with an inert gas but the pressurized processes still have the obvious disadvantage of requiring expensive apparatus and it is difficult to operate such a process under pressure continuously without shutdowns to remove the vinyl esters and the by-products.

A principal object of the present invention is the provision of a new simplified process for the preparation of vinyl esters of carboxylic acids, particularly carboxylic acids having from 9 to 19 carbon atoms, and which gives high yields without the necessity of a pressurized reaction zone.

One of the objects is the provision of a process in which relatively simply and readily available apparatus is used to improve economies in the preparation of vinyl esters of carboxylic acids.

An important object of this invention is the provision of a process in which the monomeric vinyl esters of carboxylic acids can be prepared in yields above 90% without appreciable side reactions, e.g., polymerization.

Also, another object is the provision of a process for the continuous preparation of the vinyl esters of carboxylic acids.

In accordance with the present invention, the above objects, and others which will be apparent in the specific description which follows are accomplished by a process in which a gaseous mixture of acetylene and vaporized carboxylic acids to be converted to the vinyl esters is passed into heated, high-boiling, inert liquid containing a dispersed catalyst, controlling the reaction conditions so that the concentration of the carboxylic acids in the liquid phase is maintained below 5% by weight, and subsequenly separating the vinyl ester from the gaseous effluent from the liquid phase.

This improved process is distinguished from prior processes in which the carboxylic acids were dissolved in an inert solvent with pressurized acetylene introduced into the solvent or, the alternative process of a vapor phase type reaction, in which the acetylene and the vapor of the carboxylic acid to be converted into the vinyl ester are contacted with one another in a vapor phase under pressure in the presence of a suitable catalyst. The process of this invention combines features in a manner in which yields between 80 and 95% of the vinyl esters are obtained.

This invention involves carrying out the reaction in a liquid phase reaction mixture containing a high-boiling, inert liquid with a suitable catalyst dispersed therein. The acetylene and vaporized carboxylic acid are mixed in the appropriate proportions and the gaseous mixture is passed into this liquid reaction zone at a rate which, under the reaction conditions will maintain the concentration of the dissolved carboxylic acids in the liquid phase not over 5% by weight. The formation of polymeric products is insignificant in this process even after 200 hours of continuous operation, and the gaseous effluent from the liquid reaction zone contains primarily the vinyl esters of the carboxylic acids fed into the liquid phase.

A critical feature is that the concentration of the carboxylic acids in the liquid phase must not exceed 5% by weight. Preferably, the reaction conditions are controlled to ensure that the concentration of the carboxylic acids in the liquid phase does not exceed 3% by weight and yields above 90% of the vinyl esters by weight of the converted acids are obtained when the concentration of the carboxylic acids in the liquid phase is maintained between 0.1 and 2% by weight.

Maintaining the concentration of the carboxylic acids in the liquid phase not over 5% by weight requires relatively high temperatures. Of course, the selection of the optimum temperature is dependent on other reaction conditions, such as ratio of the quantities of the acetylene and carboxylic acids, the type of catalyst and its concentration and on the boilnig point of the carboxylic acids to be converted to the vinyl esters. Generally, temperatures in the reaction zone are in excess of 150° C. and the upper limit of the temperature is approximately 300° C. at which temperature side reactions, such as decomposition of the carboxylic acids, are experienced. Therefore, it is desirable to maintain the temperature not over 300° C.; the preferred range is from 200° C. to 290° C.

Since the carboxylic acids are vaporized prior to the introduction into the reaction zone, the higher pressures of the known processes would tend to increase the concentration of the carboxylic acids in the liquid phase. Good conversion to the vinyl esters representing 80–96% yields on the basis of the acids converted are obtained if the reaction is performed at atmospheric pressure and, since the application of pressures substantially above atmospheric necessitate the use of special apparatus with safety measures to eliminate any risk of explosion, the reaction conditions at atmospheric pressure are especially desirable. In some cases, pressures substantially below atmospheric may be used, however, the preferred pressure is atmospheric, which is meant to include 1±0.5 atmosphere.

An important commercial facet of this invention is its adaptability to the continuous manufacture of vinyl esters of carboxylic acids. This non-pressurized process in which the vinyl esters can be obtained by collecting the gaseous effluent from the liquid phase lends itself well to a continuous process. It is obvious that the acetylene and the vaporized carboxylic acids may be continuously introduced into the high-boiling liquid and that the products are continuously removed through vaporization. Because of the high conversion to the vinyl esters, no significant amounts of polymeric by-products contaminate the liquid phase. Further, the liquid and the dispersed catalysts are contained in the reaction zone, and there is no carryover of the catalyst of liquid phase. Also, the high-boiling liquid phase case be continuously replaced during the process, if desired, which is an added advantage.

The high-boiling inert liquid, e.g., one which does not boil below 300° C., enables efficient heat control and allows the temperature to be maintained at the desired level with minimum fluctuations. By regulating the temperature of the gaseous mixture of the acetylene and vaporized carboxylic acids, reaction temperature can be maintained within narrow limits.

Usually, this high-boiling, inert liquid-phase is an organic compound in which the catalytic compounds, such as zinc carboxylates can be dispersed, dissolved, or held in suspension. Since it is desirable to keep the evaporation of this organic compound at a minimum under the reaction conditions, compounds with boiling points above 300° C. are preferred. The evaporation of the liquid phase would contaminate the gaseous effluent containing the vinyl esters increasing the difficulty of purifying the product.

Suitable organic compounds are those which are liquids above 100° C. and which boil above 300° C. The compounds selected should be inert to the recation and under the conditions thereof, such as paraffins with more than 16 carbon atoms per molecule and naphthenic type compounds. Also high polymeric compounds, such as polyethylene, can be used. Other compounds, such as high boiling ethers are also useful. Especially suitable for the process are the desulfurized hydrocarbon oil fractions with initial boiling points above 300° C. which are currently commercially available in the oil industry. Examples of these heavy, desulfurized oil fractions are spindle oils and the like. Aromatic-free oils proved to be desirable for the process and an example is a white highly refined medicinal oil low in aromatics and having a boiling range between 400° C. and 470° C.

Suitable catalysts are compounds of magnesium, iron, copper, aluminum, tin, boron, zinc and cadmium, and in some instances, these metallic elements in finely divided form. In particular, the zinc salts of the carboxylic acids give excellent results in the process. Zinc carboxylates which are derived from the same carboxylic acids which are to be converted to the vinyl esters in the process are the more preferred. Finely divided metallic zinc is also a suitable catalyst, but zinc carboxylates made from zinc hydroxide, zinc oxide, and zinc carbonate are preferred.

PREPARATION OF THE PREFERRED ZINC CATALYSTS

Chemically pure zinc hyroxide was reacted at a temperature of 150° C. with the desired carboxylic acids under conditions in which the acids were present in a 20% excess over the stoichiometric amount. Under these conditions, the reaction produces zinc carboxylates of the acids and water and the water is removed by distillation from the reaction subsequent to the conversion to the zinc carboxylates. The removal of the excess carboxylic acids was accomplished by vacuum distillation and the zinc carboxylates collected. Of course, other catalysts, preferably the carboxylates of the metals mentioned above, may be prepared in a similar manner. The zinc carboxylate or other metallic carboxylates are then dispersed in the high-boiling liquid phase which is used as the reaction medium.

The concentration of the zinc in the high-boiling liquid phase is always maintained below 10% by weight and preferably between .5% and 5% by weight. It is often desirable to keep the concentration of the zinc in the liquid phase between .5% and 3% since in these ranges especially high yields are obtained without any noticeable polymer by-product formation. The prepared catalyst is added directly to the high boiling liquid in the reaction zone and is dispersed uniformly therethrough. In some instances, the carboxlates will be soluble in the liquid and in others, it will be necessary to effect a mechanical suspension by physical mixing. Any suitable mixing means which is capable of keeping the mixture of zinc carboxylates and the high boiling liquid in a reasonable uniform state is suitable and, since the overall process is improved when the liquid phase is agitated during the introduction of the gaseous mixture of the carboxylic acids and acetylene into the liquid phase, it is desirable to have a mechanical agitator even when the zinc carboxylates are soluble in the liquid phase.

In this improved process, the formation of by-products such as polymeric compounds occurs in insignificant quantities. To avoid even slight polymer by-product formation, one or more of the polymerization inhibitors can be added to the liquid phase containing the dispersed zinc carboxylates. However, it should be noted that such inhibitors should be selected from the group which will not be evaporated from the liquid phase during the reaction and carried over with the vinyl esters, thereby contaminating them.

While this new improved process is adaptable to a variety of starting materials in the carboxylic acids group, it is important to note that operation of the process requires the carboxylic acids to be vaporized. At temperatures above 300° C., most of the carboxylic acids experience decomposition and therefore the mono- and dicarboxylic acids which can be vaporized at or under 300° C. are the most suitable starting materials for the preparation of the vinyl esters by this process. Several examples of suitable acids are: acetic, propionic, butyric, valeric, palmitic, lauric, stearic, benzoic, and the like. Generally, carboxylic acids having in excess of 20 carbon atoms are prone to thermally decompose prior to vaporization and therefore are not suitable starting materials for the process.

A very important group of carboxylic acids, which are the preferred starting materials, is the group of carboxylic acids containing a tertiary and/or a quaternary carbon atom in the alpha or beta positions with respect to the carboxyl group and, in particular, the saturated aliphatic monocarboxylic acids in which the carboxyl group is directly linked to the tertiary or quaternary carbon atom. Since these acids have branched chains their boiling points are generally lower than the isomeric unbranched acids of the series containing 19 or less carbon atoms per molecule, therefore these alpha-branched acids are the desired starting materials in this improved process. The commercial importance of the vinyl esters of the alpha-branched carboxylic acids, because of their good chemical stability, makes it especially important to have a commercial process for their preparation, especially those having between 9 and 19 carbon atoms.

Carboxylic acids, which are preferred, e.g., those having a branched chain and an alpha carbon atom which is a teritary or quaternary carbon atom, can be prepared from the $C_{3-18}$ cuts of olefinic hydrocarbons obtained in the petroleum industry. These olefinic hydrocarbons are reacted with formic acid or alternatively with carbon monoxide and water in a synthesis which is catalyzed by acid compounds, such as phosphoric acid, sulfuric acid, and complexes of phosphoric acid and boron trifluoride. A less convenient method for manufacturing these acids is from a $C_{3-18}$ saturated hydrocargon in which a hydrogen acceptor is present in the reaction mixture. Suitable hydrogen acceptors are olefins or compounds from which olefins can be formed by splitting off water or a hydrogen halide, such as alcohols and alkyl halides, respectively.

The more preferred starting materials are the saturated aliphatic alpha-branched monoalkanoic acids having from 9 to 11 carbon atoms and containing no more than one alpha-hydrogen; they may be represented by the formula

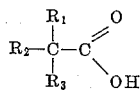

wherein $R_1$ is hydrogen or alkyl of from 1 to 7 carbon atoms and $R_2$ and $R_3$ are alkyls of from 1 to 7 carbon atoms. These acids can be prepared by the reaction of a $C_{8-10}$ olefinic hydrocarbon cut with formic acid or alternatively with carbon monoxide and water in an acid catalyzed reaction. The products of this reaction are a mixture of the alpha-branched monocarboxylic acids having from 9 to 11 carbon atoms per molecule which are especially suitable starting materials in our process.

Another group of preferred starting materials are similar saturated aliphatic monocarboxylic acids having from 15 to 19 carbon atoms per molecule wherein $R_1$ is hydrogen or alkyl of from 1 to 15 carbon atoms and $R_2$ and $R_3$ are alkyls having from 1 to 15 carbon atoms. These acids can be prepared by reaching an olefinic $C_{14-18}$ hydrocarbon cut with formic acid or alternatively with carbon monoxide and water in the presence of an acid catalyst. A mixture of monocarboxylic acids having from 15 to 19 carbon atoms is produced from the mixture of olefins.

While the molar ratio of the acetylene to the vaporized carboxylic acid in the gaseous mixture introduced into the reaction zone can vary within a range of 1:1 to 30:1, the preferred range is from 5:1 to 25:1. Ratios outside these preferred limits can be used but with a sacrifice in the yield.

The reaction can be carried out in any suitable vessel capable of containing the high boiling liquid phase with the dispersed zinc carboxylates. It is desirable to have good mechanical agitation of the liquid phase since, as in any process, intimate contact between the reactants and the catalyst is especially desirable. The reaction zone is equipped with a suitable heating means in order to maintain the temperature within the prescribed limits and any suitable method can be used to introduce the gaseous mixture of acetylene and vaporized carboxylic acids into the liquid phase. A simple method of accomplishing the desired effect is to disperse the gaseous mixture in the bottom of the reaction vessel so that the gas passes upward into the liquid phase, during which time the vinyl esters are formed. The gaseous effluent from the liquid phase is primarily the vinyl esters of the carboxylic acids and can be collected by a suitable condensation apparatus, and later purified by fractional distillation.

Having fully described our improved process, the following examples will further illustrate how the process may be carried out in practice, but the invention is not restricted by these examples. In the examples, all percentages are parts by weight unless otherwise indicated, and the relationship of weight to volume is that of kilogram to liter.

*Example I*

In Example I and the following examples, the same reaction apparatus was used and therefore will only be described in Example I, the description being applicable to the remaining examples.

The apparatus in general consisted of a glass tubular reactor fitted with a vibro-mixer and having a length of approximately 14 centimeters and a diameter of 36 millimeters, and the reaction vessel was filled with a refined petroleum base medicinal white oil consisting of a sulfur-free, aromatic-free white oil having a boiling range between 400° C. and 470° C. Approximately 50 grams of zinc carboxylates were added to the oil such that the concentration of the zinc in the oil was approximately 1%.

The zinc carboxylates were made by reacting zinc hydroxide with the mixture of alpha-branched monocarboxylic acids obtained by treating a $C_{8-10}$ cracked wax olefinic hydrocarbon cut with carbon monoxide and water in the presence of an acid catalyst.

The reactor was equipped with a perforated manifold in the bottom for dispersing the gaseous mixture of acetylene and vaporized carboxylic acids into the reaction medium and the ractor was placed in a heating bath with a temperature control.

Before the process was commenced the liquid phase, e.g., the oil containing dispersed zinc carboxylate, in the reaction vessel was purged to remove oxygen and water vapor with the mechanical mixer in operation. Typically, the purging is accomplished by heating the liquid phase to approximately 285° C. and passing pure nitrogen through the mixture until it is free of water and oxygen.

Subsequent to the purging of the liquid phase, the process was commenced by the introduction of a gaseous mixture of vaporized alpha-branched carboxylic acids having from 9 to 11 carbon atoms and acetylene through the manifold into the liquid phase while it was being agitated. The temperature in the liquid phase reaction zone was maintained at approximately 285° C. and a molar ratio of carboxylic acids to acetylene of 1:5.5 was introduced into the liquid phase at a rate so that 5 grams of the acid per hour passed into the liquid phase.

Samples were withdrawn from the liquid phase at intervals and were analyzed for the concentration of the carboxylic acids. By this method it was determined that the concentration of the carboxylic acids never exceeded 0.2% by weight of the solution during the reaction period.

The gaseous effluent from the reaction zone was condensed, and subsequently the vinyl esters of the alpha-branched $C_{9-11}$ monocarboxylic acids were isolated by fractional distillation. It was found that 85.5% by weight of the converted carboxylic acids feed was converted into the corresponding vinyl esters.

*Example II*

In this example, the same apparatus as used in Example I was charged with additional zinc carboxylates to bring the concentration of the zinc in the liquid phase to 3% by weight. Agitation was begun and the temperature of the liquid phase was raised to 230° C. while the pure nitrogen was passed through it to purge it of water and oxygen.

Thereafter, a gaseous mixture of vaporized alpha-branched $C_{9-11}$ monocarboxylic acid and acetylene was passed into the liquid phase through the gas manifold. The molar ratio of the vaporized carboxylic acids to the acetylene was 1:9 and the rate of feed based on the vaporized acids in the gaseous mixture was approximately 5 grams per hour. Samples of the liquid phase collected during the reaction revealed that the concentration of the carboxylic acids in it never exceeded 0.5% by weight.

After the process had continued for several hours, analysis revealed that 98.7% of the $C_{9-11}$ carboxylic acids introduced had been converted and that the selectivity to vinyl esters of these carboxylic acids was 96.1% by weight.

*Example III*

In order to demonstrate one of the important objects of the process, e.g., the continuous operation, an experiment was conducted which involved 200 hours of continuous operation using the same apparatus as was described in Example I with the zinc concentration in the liquid phase being 1.5% by weight. The heated bath was adjusted to maintain the temperature at 275° C. and the liquid phase was purged as before. The same alpha-branched $C_{9-11}$ monocarboxylic acids as used in Examples I and II were vaporized and mixed with acetylene in a molar ratio of 1:9 and the gaseous mixture passed into the liquid phase at the rate to introduce 5 grams of acids per hour. Sampling of the liquid phase at intervals revealed that the concentration of the carboxylic acids in the oil varied from 0.3% to 0.4% by weight.

It is quite surprising to find that for the entire 200 hours of operation, the conversion of the carboxylic acids into the vinyl esters was almost constant. The analysis demonstrated that 94.5% by weight of the carboxylic acids were converted with a selectivity of 94% by weight to the vinyl esters.

*Example IV*

In this example, a mixture of the alpha-branched carboxylic acids having from 15–19 carbon atoms were utilized. These acids were prepared by the reaction of a $C_{14-18}$ cracked wax olefinic hydrocarbon cut with carbon monoxide and water in the presence of an acid catalyst as previously described.

The catalyst was 1.5% zinc as zinc carboxylate of monocarboxylic acids. The liquid phase was heated to a temperature of 295° C. and purged with pure nitrogen to remove the oxygen and water.

Vaporized carboxylic acids having from 15 to 19 carbon atoms were mixed with acetylene to form a gaseous mixture in which the molar ratio of the acids to the acetylene was 1:20. This gaseous mixture was introduced into the liquid phase through the gas manifold at a rate to introduce 5 grams of acids per hour. During the operation of the process, the acids concentration in the liquid phase was checked at intervals and the maximum concentration of the acids never exceeded 0.8% by weight.

Analysis demonstrated that 95.3% by weight of the carboxylic acids in the feed had reacted and of the reacted acids, 74.3% had been converted into the corresponding vinyl esters of the acids.

In order to demonstrate the surprising results obtained by this improved process, the two additional examples, labeled Examples A and B are set forth for comparison. A perusal of Examples A and B will demonstrate the superiority of the improved process used in Examples I–IV.

EXAMPLE A

The same apparatus described in Example I was used and charged with a charge of the same refined white oil with the zinc carboxylates of the alpha-branched $C_{9-11}$ monocarboxylic acids added until the zinc concentration was 3% by weight. Thereafter, a mixture of the alpha-branched $C_{9-11}$ monocarboxylic acids were added until their concentration in the liquid phase was 5% by weight.

The temperature of the liquid phase was raised to 230° C. and pure nitrogen was passed through the liquid phase to remove any oxygen or water.

With the temperature maintained at 230° C., a mixture of the vaporized alpha-branched $C_{9-11}$ monocarboxylic acids and acetylene in a molar ratio of 1:1 was introduced through the manifold into the liquid phase at a rate to introduce 5 grams of the carboxylic acids into the liquid phase per hour.

At the end of seven hours, the experiment had to be discontinued because of the presence of large quantities of polymerized, high-boiling by-products and the concentration of the $C_{9-11}$ monocarboxylic acids in the liquid phase had risen from 5% by weight to 6% by weight. The presence of these high boiling-by-products reduced the activity of the catalyst and the reaction was discontinued. Analysis revealed that approximately 93.6% of the carboxylic acids introduced into the liquid phase have been converted and that only 46.2% of the converted acids were converted into the vinyl esters.

EXAMPLE B

Again, the apparatus described in Example I was used and was charged with the $C_{9-11}$ monocarboxylic acids without the white oil. The zinc carboxylates of the $C_{9-11}$ monocarboxylic acids were added to the pure acids until the zinc concentration in the liquid phase was 3% by weight.

Though the use of a heating bath, the temperature of the liquid phase was raised to 230° C. and pure nitrogen was passed through the liquid phase to purge it of oxygen and water.

For a period of 3 hours, with the temperature maintained at 230° C., a gaseous mixture of vaporized $C_{9-11}$ monocarboxylic acids and acetylene in a molar ratio of 1:9 was introduced into the liquid phase at a rate of 5 grams per hour based on the acids content of the gaseous feed.

While the amount of acetylene in the feed was sufficient to convert all the acids present to the corresponding vinyl esters, it was found that the concentration of the acids in the liquid phase dropped from 80% to 50% during the reaction period and an analysis revealed that approximately 43.3% of the acids had been converted and that 63.7% of the acids converted were changed into the corresponding vinyl esters. A considerable amount of polymerized by-product was present in the liquid phase.

From a perusal of the examples, set forth above, it is to be seen that the concentrations of the carboxylic acids in the liquid phase must be maintained below 5% by weight and preferably below 3% in order to obtain the outstanding results via this improved process. The improved process resulted in higher conversions and high selectivity for the vinyl esters.

We claim as our invention:

1. A process for the preparation of vinyl ester of alkanoic mono-carboxylic acid which comprises passing a gaseous mixture of acetylene and said acid into a high-boiling inert liquid phase containing a dispersed catalyst of the group consisting of the magnesium, iron, copper, aluminum, tin, boron, zinc or cadmium containing catalysts while maintaining the temperature of said liquid phase between 200° C. and 300° C. and controlling the rate of feed of said gaseous mixture into said liquid phase to avoid carboxylic acid concentration in said liquid phase exceeding 5% by weight, collecting the resulting gaseous effluent from said liquid phase, and subsequently separating the vinyl ester of alkanoic mono-carboxylic acid from said gaseous effluent.

2. The process according to claim 1 in which the catalyst are zinc carboxylates of the alkanoic monocarboxylic acid to be converted into the vinyl esters and in which the zinc concentration of the liquid phase is less than 5% by weight.

3. A process according to claim 1 in which the liquid phase is a petroleum base medicinal white oil boiling above 300° C. and containing zinc carboxylate as catalyst.

4. A process according to claim 1 in which the molar ratio of the alkanoic monocarboxylic acid and acetylene in the gaseous mixture is from 1:5 to 1:25.

5. A process for the preparation of the vinyl esters of alkanoic monocarboxylic acid having from 2 to 19 carbon atoms by passing a gaseous mixture of such vaporized carboxylic acid and acetylene in a molar ratio of from 1:1 to 30:1 into a heated liquid phase containing dispersed zinc carboxylate, said zinc carboxylate being present in an amount to give a zinc concentration between 1% and 5% by weight, while maintaining the temperature of said liquid phase between 200° C. and 300° C. and controlling the rate said gaseous mixture is introduced into said liquid phase to avoid carboxylic acid concentration in said liquid phase from exceeding 3% by weight, collecting the resulting gaseous effluent from said liquid phase and subsequently separating the vinyl esters of such alkanoic monocarboxylic acid from the gaseous effluent.

6. A process according to claim 5 in which the molar ratio of the acetylene to carboxylic acid is from 5:1 to 25:1.

7. A process for the continuous preparation of the vinyl esters of alkanoic monocarboxylic acid having from 9 to 19 carbon atoms and containing no more than one alpha-hydrogen atom by passing a gaseous mixture of such vaporized acid and acetylene in a molar ratio of from 1:5 to 1:25 into a high boiling inert liquid containing a corresponding zinc alkanoic monocarboxylate in an amount to give a zinc concentration between 1% and 3% by weight in said liquid phase while maintaining the temperature of said inert liquid between 200° C. and 300° C., controlling the rate of introduction of the said gaseous mixture in said liquid to maintain the concentration of such carboxylic acid in said liquid phase below 1% by weight, collecting the resulting gaseous effluent from said liquid and subsequently separating the vinyl esters of such carboxylic acid from said gaseous effluent.

8. A process according to claim 7 in which the liquid phase is a desulfurized paraffinic hydrocarbon oil fraction boiling above 300° C.

9. A process according to claim 7 in which the alkanoic monocarboxylic acid has from 9 to 11 carbon atoms.

No references cited.

CHARLES B. PARKER, *Primary Examiner.*
DANIEL D. HORWITZ, *Examiner.*
A. H. SUTTO, *Assistant Examiner.*